(12) United States Patent
Parks et al.

(10) Patent No.: US 8,784,214 B2
(45) Date of Patent: Jul. 22, 2014

(54) METHOD AND SYSTEM FOR ESTABLISHING LOCATION-BASED LEADERBOARD

(75) Inventors: William T. Parks, San Francisco, CA (US); Luke Bond, London (GB); Mark Petty, London (GB)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/176,640

(22) Filed: Jul. 5, 2011

(65) Prior Publication Data

US 2013/0013094 A1    Jan. 10, 2013

(51) Int. Cl.
   *A63F 9/24*    (2006.01)
   *A63F 13/00*   (2014.01)
   *G06F 17/00*   (2006.01)
   *G06F 19/00*   (2011.01)

(52) U.S. Cl.
   USPC ............. 463/42; 463/40; 463/41; 709/202; 455/465

(58) Field of Classification Search
   USPC .............. 463/40–42; 709/202; 455/465.5
   See application file for complete search history.

(56) References Cited

U.S. PATENT DOCUMENTS 6,840,861 B2 *  1/2005  Jordan et al. ............... 463/42
6,985,747 B2 *  1/2006  Chithambaram ......... 455/456.5
2007/0238507 A1 * 10/2007  Sobel et al. ................. 463/17
2011/0010464 A1 *  1/2011  Morrison et al. ........... 709/245
2011/0252079 A1 * 10/2011  Werner et al. .............. 709/202

OTHER PUBLICATIONS

U.S. Appl. No. 13/181,464, filed Jul. 12, 2011.
U.S. Appl. No. 13/190,411, filed Jul. 25, 2011.
International Search Report mailed date Jul. 27, 2012, for International PCT Application No. PCT/US2012/045454.

* cited by examiner

*Primary Examiner* — Milap Shah
*Assistant Examiner* — Jason Pinheiro
(74) *Attorney, Agent, or Firm* — Joshua D. Isenberg; JDI Patent

(57) ABSTRACT

Methods for establishing a location-based leaderboard by a computer game system are disclosed. The world may be partitioned into a set of regions and sub-regions by the computer game system using a hierarchical spatial data structure, wherein the regions and sub-regions are arranged according to a hierarchy, each sub-region being encompassed by a higher-level sub-region or region, and two or more highest-level sub-regions being encompassed by a region. A location of a user of the computer game system along with one or more statistics associated with the user may be assigned to a smallest sub-region created by the hierarchical spatial data structure. A rank of the user may then be determined within a region or sub-region encompassing the smallest sub-region to which the user's location was assigned, wherein the rank is determined using the one or more statistics associated with the user. One or more users may then be notified of the rank.

21 Claims, 9 Drawing Sheets

– 1 –
METHOD AND SYSTEM FOR ESTABLISHING LOCATION-BASED LEADERBOARD

FIELD OF INVENTION

Embodiments of the present invention are related to online games and more specifically to methods and systems for establishing location-based leaderboards.

BACKGROUND OF THE INVENTION

Several of today's most popular computer game platforms (e.g., XBOX 360, PS3, etc.) implement leaderboards to establish a ranking system for users of their devices. For example, for a particular game title, all users of that game may be ranked according to certain criteria including: best score by game mode, best overall score, wins/losses, total features unlocked, etc. This allows users to compare their performance to other users under similar settings.

However, an issue arises when determining sample size for establishing leaderboards. Currently, gaming platforms are set up to use leaderboards that rank all users who have played a particular game title under similar settings. Such leaderboards do not enable a user to rank himself against a smaller subset of users. Specifically, such leaderboards do not allow a user to determine his rank in relation to his area (e.g., city, county, state, etc.).

There are some types of location-based leaderboards. However, these location-based leaderboards may just grab the closest few, e.g., 10 or 100, other users around a given user's location to provide a sampling instead of cold-hard ranking of the type one would obtain with a traditional leaderboards.

It is within this context that embodiments of the present invention arise.

DESCRIPTION OF THE SPECIFIC EMBODIMENTS

Figure 1A:
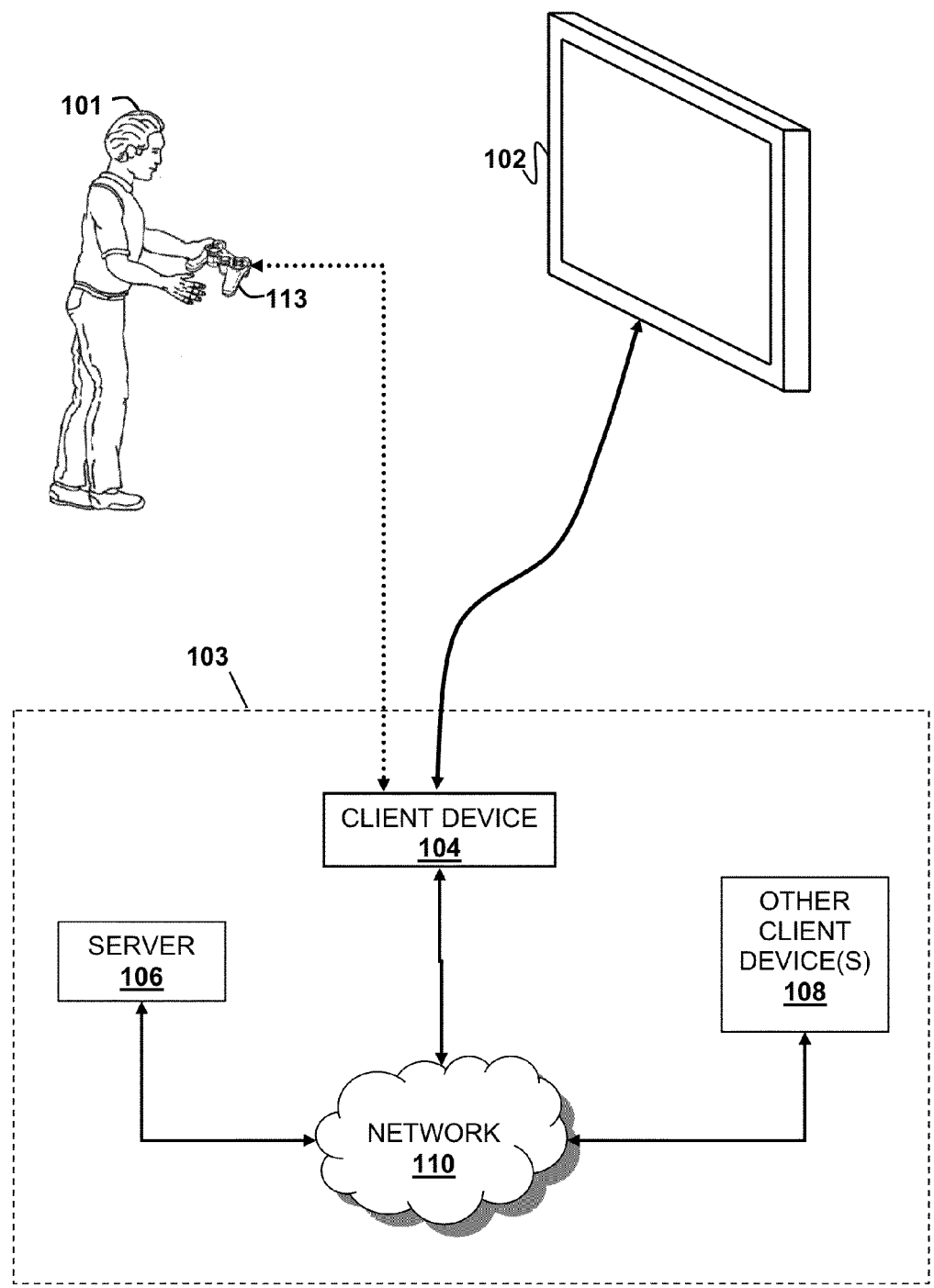
FIG. 1A is a schematic illustrating a gaming environment in which a location-based leaderboard may be implemented according to an embodiment of the present invention.

FIG. 1A is a schematic illustrating a gaming environment implementing a method for establishing a location-based leaderboard accompanied by a flow diagram illustrating said method according to an embodiment of the present invention. A user 101 of a computer system 103 may interact with a game running on the system 103 by way of a user interface 113 (e.g., wireless controller). The computer game system 103 may be connected to a visual display 102 configured to display images associated with the game running on the computer game system 103.

By way of example, and not by way of limitation, the computer system 103 may include a client device 104, such as a video game console. The display 102 may be directly or indirectly connected to the client device 104 by a wired or wireless connection. Similarly, the user interface may be connected to the client device 104 by a wired or wireless connection. In the computer system 103, the client device 104 may be connected to a server 106 and/or other client devices 108 via a network 110. The client device 104, server 106 and other client devices 108 may be implemented as general purpose computers that operate as special purpose computers when programmed by suitable software. Alternatively, client device 104, server 106 and other client devices 108 may be implemented as special purpose built hardware implemented, e.g., using, inter alia, application-specific integrated circuit (ASIC) components. The client devices 104, 106 may be implemented in a variety of ways, including as computers, video game consoles, portable gaming devices, portable communication devices, cellular telephones, consumer electronic devices, set top boxes, servers, clients, networked devices, and the like. The clients 104, 108, and server 106 may be equipped with conventional mechanisms to transmit and receive information via the network 110, such as ports, network cards, receivers, modems, and so on.

The network 110 is representative of many different network types, including public networks (e.g., the Internet) and proprietary networks. The network 110 may be implemented using wireless technologies (e.g., radiofrequency, microwave, cellular, and the like), wire-based technologies (e.g., cable, fiber optic, twisted pair wire, co-axial cable, and the like), or any combination of wired and/or wireless technologies. Any one of many diverse protocols and formats may be used to package data and transmit it among the client device 104, server 106 and other client devices 108.

In embodiments of the present invention, different users may play video games via the computer system 103. Each user may have an account registered with the server 106 and the server may keep track of each user's activities with respect to the game. By way of example, and not by way of limitation, the computer system 103 may be a computer game system in which the server 106 keeps track of a user's game scores. A user 101 playing a game on the computer system 103 may want to know how his score ranks in relation to other users playing in a similar location. By way of example, and not by way of limitation, this location may encompass the user's neighborhood, city, state, or country. Being able to identify his rank amongst a smaller subset of opposing users allows the user to gain a clearer perspective on his skill level and ability. For example, a user who is ranked 500,000 out of 1,000,000 users can hardly gain any insight from that ranking, because the sample is too great to formulate any relevant conclusions. However, that same user may be ranked 10 out of 500 in his neighborhood, a status that may provide plenty of insight regarding his aptitude for playing a particular game. Moreover, being ranked $10^{th}$ out of 500 implies being highly skilled, perhaps boosting user morale or providing a user with more incentive to continue playing that particular game; whereas being ranked $500,000^{th}$ out of 1,000,000 implies being average, which might tend to discourage a user from continuing to play that particular game. However, there are other interesting ways of boosting user morale. For instance, instead of presenting absolute rankings, relative user rankings may be presented, e.g., with a given user's ranking expressed in terms of a percentile.

Figure 1B:
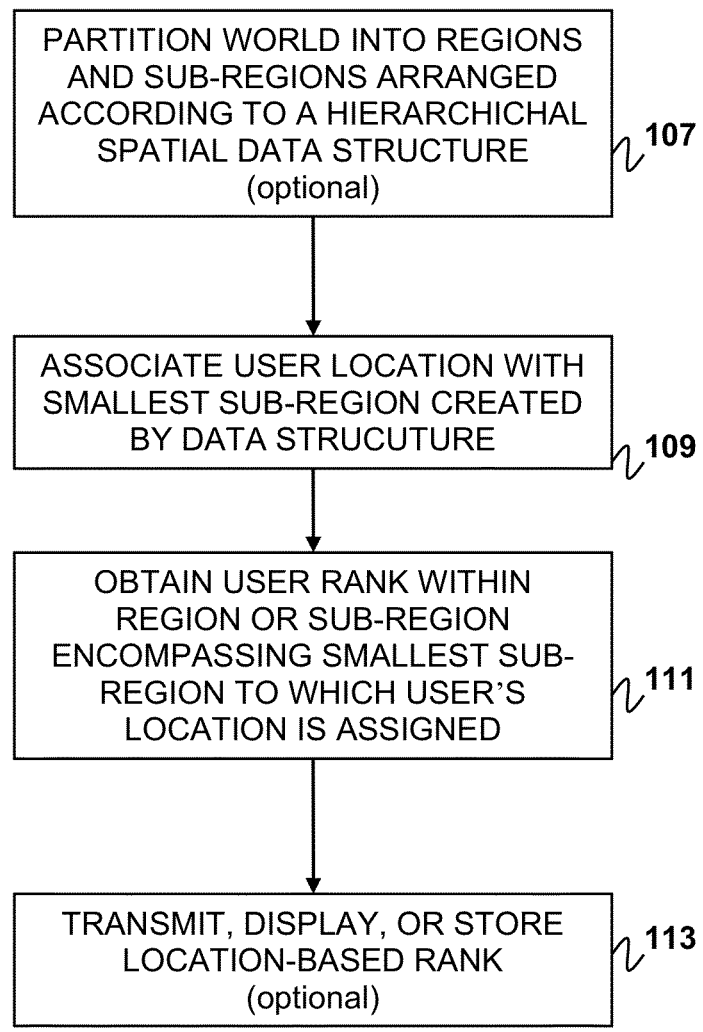
FIG. 1B is a flow diagram illustrating said method for establishing a location-based leaderboard according to an embodiment of the present invention.

A location-based leaderboard may be established by the computer system 103 as shown in FIG. 1B. Initially, the computer system 103 partitions the world into a set of regions and sub-regions using hierarchical spatial data structure, wherein the regions and sub-regions are arranged according to a hierarchy as described at 107. By way of example, and not by way of limitation, the hierarchical spatial data structure may be a geodesic grid, a quad-tree, or an R-tree. Other hierarchical spatial data structures may also be used.

A geodesic grid technique can be used to model the surface of a spherical or approximately spherical region (e.g., a planet such as Earth) with a subdivided polyhedron, such as an icosahedron. In a geodesic grid data structure cells or tiles are used to statistically represent data encoded to the area covered by the cell location. Geodesic grids have been developed by subdividing a sphere to developing a global tiling (tessellation) based on a geographic coordinates (longitude/latitude) where a rectilinear cell is defined as the intersection of a longitude and latitude line. This approach can be understood in terms of accepted Earth reference, accessible using the longitude and latitude as an ordered pair, and implemented in a computer coding as a rectangular grid.

The quad tree (or Quadtree) and R-tree are hierarchical spatial data structures that use rectangular grids which can be based, e.g., on latitude and longitude. In a quad tree (or Quadtree) each internal node has exactly four children. Quadtrees are often used to partition a two dimensional space by recursively subdividing it into four quadrants or regions. The regions may be square or rectangular, or may have arbitrary shapes. Quadtrees generally decompose space into adaptable cells, each of which has a maximum capacity. When maximum capacity is reached, the cell splits. The directory of the Quadtree follows the spatial decomposition of the Quadtree.

An R-tree data structure splits space with hierarchically nested, and possibly overlapping, minimum bounding rectangles (MBRs, also known as bounding boxes). Each node of an R-tree has a variable number of entries (up to some predefined maximum). Each entry within a non-leaf node stores two pieces of data: a way of identifying a child node, and the bounding box of all entries within this child node. The insertion and deletion algorithms use the bounding boxes from the nodes to ensure that "nearby" elements are placed in the same leaf node (in particular, a new element will go into the leaf node that requires the least enlargement in its bounding box). Each entry within a leaf node stores two pieces of information: a way of identifying the actual data element (which, alternatively, may be placed directly in the node), and the bounding box of the data element. Searching algorithms for an R-tree data structure (e.g., intersection, containment, nearest) use the bounding boxes to decide whether or not to search inside a child node. In this way, most of the nodes in the tree are never "touched" during a search. Different algorithms can be used to split nodes when they become too full, resulting in the quadratic and linear R-tree sub-types.

Figure 2:
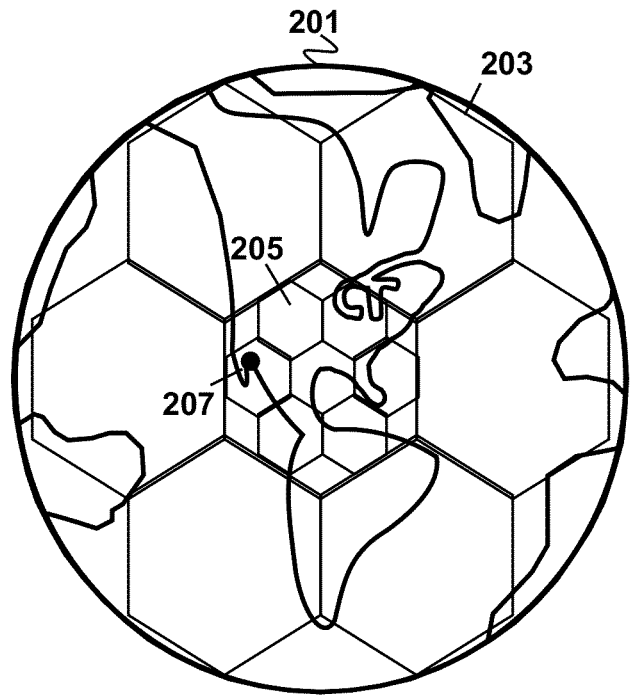
FIG. 2 illustrates an example of a world partitioned into regions and sub-regions arranged in a hierarchy using a hierarchical spatial data structure according to an embodiment of the present invention.

FIG. 2 illustrates an example of a world 201 partitioned into regions and sub-regions arranged in a hierarchy using geodesic grids according to an embodiment of the present invention. As alternatives to geodesic grids, the world 201 may be partitioned into regions and sub-regions using, e.g., a quad tree or an R-tree or other hierarchical spatial data structure. The world 201 may initially be divided into several regions 203. These regions may be of a suitable size, e.g., hemispheric, continental, or sub-continental. Each region 203 may be further partitioned into a set of sub-regions 205, e.g., nations, groups of nations, or regions of nations. These sub-regions may be further divided into smaller sub-regions (not illustrated) until a desired level of granularity is achieved. These smaller sub-regions may include states or provinces, counties, cities, neighborhoods, etc. By way of example, and not by way of limitation, determining whether or not a sub-region is partitioned into several smaller sub-regions may be based on a given sub-regions population density. For example, a sub-region encompassing an entire county in Montana may not be further divided because its scarce population density falls below a maximum threshold. However, a sub-region encompassing the city of Manhattan may be further partitioned because its heavily-concentrated population density rises above the maximum threshold. This implementation allows one to easily transition between smaller sub-regions and larger sub-regions or regions by moving up and down the hierarchy, which allows for easy control of a leaderboard's sample size.

It is noted that in embodiments of the present invention, the world 201 may be a real world (e.g., planet Earth) or a virtual world. For example, in some embodiments, the world 201 may represent a set of locations in a virtual world that is simulated on one or more computer systems, which may be networked together. These computer systems may include a server (e.g., server 104) and one or more client devices (e.g., client device 104). By way of example, and not by way of limitation, a server (e.g., server 106) may associate some virtual world location with each user of the virtual world and a hierarchical spatial data structure may be generated based on these locations. The computer system(s) allow uses to access a computer-simulated environment and receive perceptual stimuli related to that environment.

As used herein, the term "virtual world" generally refers to a simulated environment in which users may interact with each other via one or more computer processors. Users may appear in the simulated environment in the form of representations referred to as avatars. Avatars may be presented as textual, two-dimensional, or three-dimensional video representations. Avatars may also be represented to users in the form of auditory or touch sensations. The simulated environment may appear similar to the real world or instead depict fantasy worlds. The degree of interaction among the users, the avatars and the simulated environment can be governed by a set of rules implemented by the computer system(s). Examples such rules may include the behavior of gravity, topography, locomotion, real-time actions, and communication. Communication between users may be in the form of, e.g., text, graphical icons, visual gestures, sound, touch, voice command text, or balance senses.

Examples of virtual worlds include PlayStation Home, from Sony Computer Entertainment, or massive multi-player online games, such as World of Warcraft. Virtual worlds are not limited to games but and may also encompass computer conferencing and text based chatrooms.

After partitioning the world 201 into a set of regions 203 and sub-regions 205, the location of the user 101 as well as one or more statistics associated with the user of the computer system 103 are assigned to a smallest sub-region created by the hierarchical spatial data structure as described at 109. FIG. 2 illustrates the location of the user 207 in relation to the set of regions and sub-regions. By way of example, and not by way of limitation, the computer system 103 may determine the location of the user 207 using a global positioning satellite (GPS) receiver installed in the computer system 103. The smallest sub-region may vary depending on the user's actual physical location. Expanding on the example from above, a user located in a small town in Montana may be assigned to a smallest sub-region that spans an entire county of Montana. On the other hand, a user in the densely populated city of Manhattan may be assigned to a smallest sub-region that spans only a few city blocks.

It is noted that the steps illustrated in FIG. 1B may be implemented by a computer program running on one or more components of the computer system 103. In some embodiments, all or nearly all steps may be implemented on the server 106. In other embodiments some or all steps may be implemented on the client device 104 or other client devices 108. In still other embodiments the various steps may be distributed amongst the client device 104, server 106, and other client devices 108.

The user statistics that are assigned to the smallest sub-region provide critical information for determining the user's relative rank. By comparing like statistics amongst a group of users, a categorized ranking system may be established amongst that group of users. By way of example, and not by way of limitation, such statistics may include the user's best score by game mode for each title played, best overall score for each title played, win/loss record for each title played, total features unlocked for each title played, or any other user statistics relevant to determining a relative ranking for the user.

Once a user's location and statistics are assigned to a smallest sub-region, the computer game system may then establish a rank for that user within a region or sub-region encompassing the smallest sub-region to which the user was assigned as described at 111. Having the regions and sub-regions partitioned in a hierarchical manner allows the computer game system to seamlessly transition between larger and smaller leaderboard sample sizes depending on the application. For example, a computer game system can modify the leaderboard from ranking the user in relation to his city to ranking the user in relation to his county by simply moving up the hierarchy from a smaller sub-region encompassing his city to a higher sub-region encompassing both his city and county.

It is important to note that the location-based leaderboard established by the computer system may be further transmitted to users located within the particular sub-region or region within which the user's rank is determined. By enabling a computer system 103 to establish location-based leaderboards, a user of the computer system may gain valuable insight from his localized rank (in contrast to his global rank) and additionally obtain bragging rights within a regionalized locale.

It is noted that embodiments of the present invention are not limited to implementations in which the user's location is determined by GPS. Instead, other geolocation devices may be used. Alternatively, the user may manually enter an address (e.g., number, street, city, state, and country) or geographic coordinates in response to a query from the system 103. Furthermore, in some embodiments of the present invention, the user's location need not be continuously tracked. For example, in some implementations, the user 207 may registering a location once (e.g., as determined by GPS or entered manually), and that location may be used as the user's default location for all subsequent transactions. This allows the user 207 to interact with the system 103 during travel and still have the user's leaderboard information tracked relative to the default location.

Figure 3A:
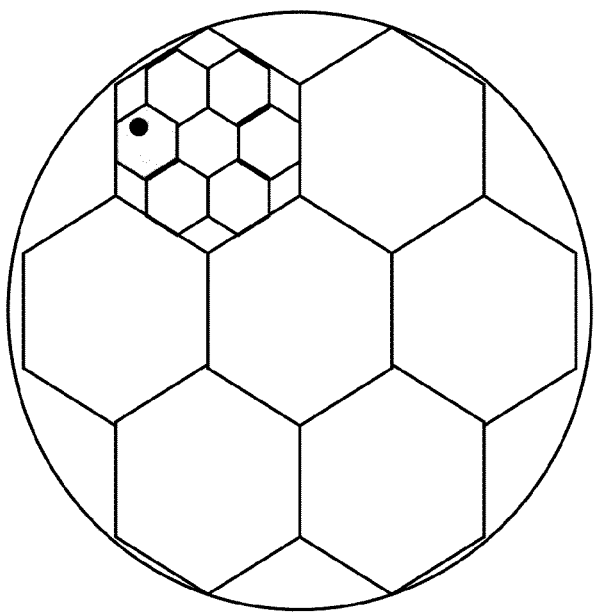
FIGS. 3A-3C are schematic diagrams illustrating examples of a computer game system implementing a method for establishing a location-based leaderboard.
Figure 3B:
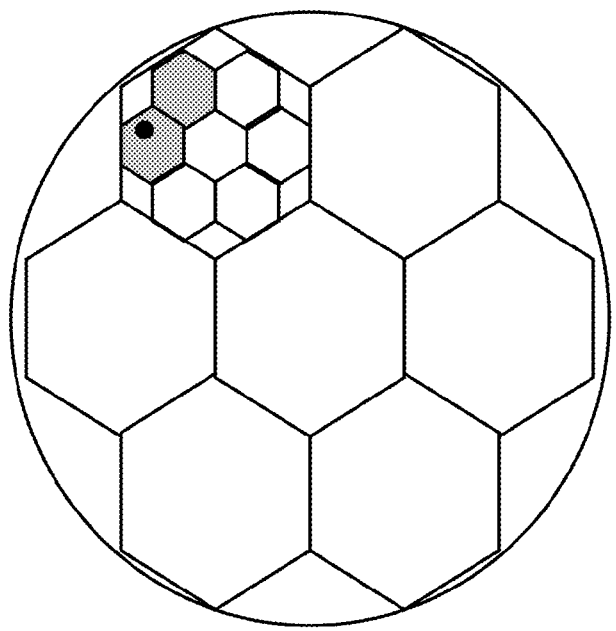
Figure 3B:
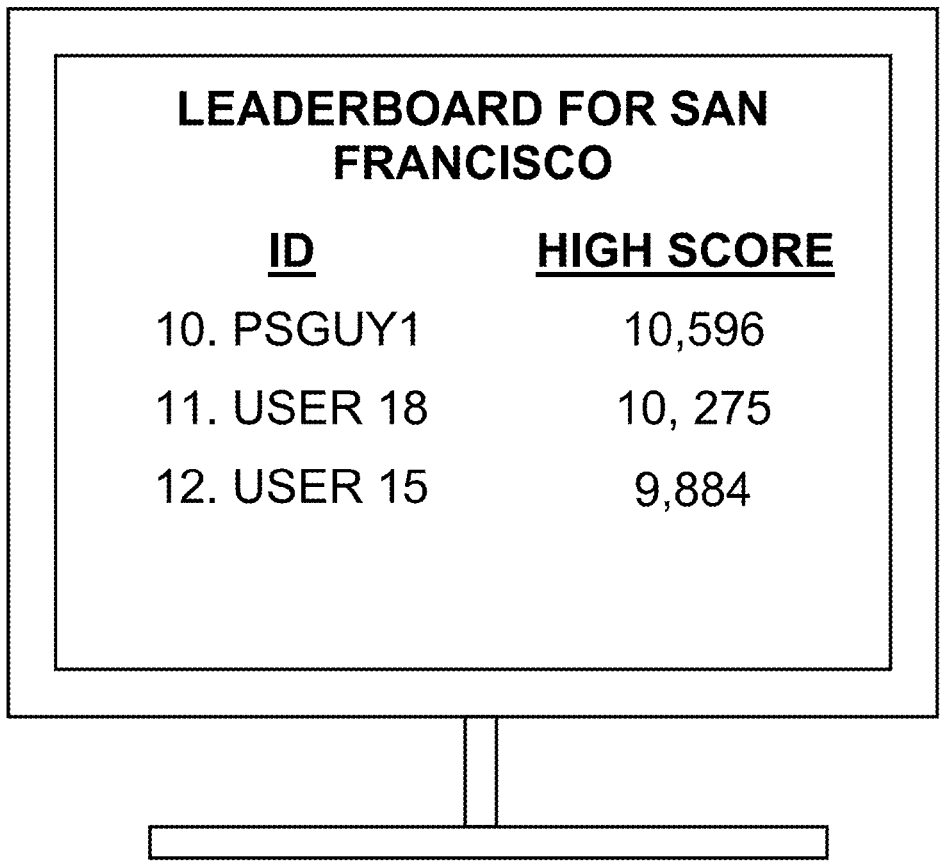
Figure 3C:
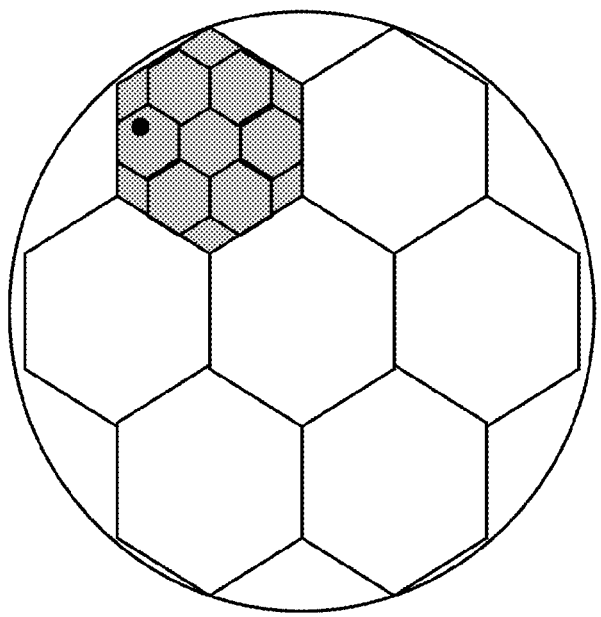

FIGS. 3A-3C are schematic diagrams illustrating examples of a portion of a computer system implementing a location-based leaderboard. In each diagram, a partitioned world is provided, with the shaded area representing the sub-region or region within which the user of the computer game system is ranked. The black dot represents the user location relative to the sub-regions and regions.

FIG. 3A depicts a leaderboard illustrating the rank of a user (i.e., PSGUY 1) within a smallest sub-region of the partitioned world. In this example, the smallest sub-region represents a district (e.g., Mission District) of a city (e.g., San Francisco). The user in this example (i.e., PSGUY1) is the highest-ranked user in this smallest sub-region. Being that this particular user is the highest-ranking user of his regional locale, he may want to know how he compares to a larger sample size. The computer game system may step up the hierarchy as discussed above to establish a leaderboard for a larger regional locale.

FIG. 3B depicts a leaderboard illustrating the rank of a user (i.e., PSGUY1) within a larger sub-region of the partitioned world that encompasses the smallest sub-region in FIG. 3A. In this example, the larger sub-region represents a city (e.g., San Francisco). The user in this example (i.e., PSGUY1) is no longer the highest ranking member of the leaderboard. Instead, he is the $10^{th}$ highest-ranking member of the leaderboard, due to the larger sub-region comprising a greater number of high-scoring users than the smallest sub-region. Also, the users ranked number 2 and 3 in the leaderboard of FIG. 3A are no longer ranked in the top 10 of the new leaderboard. Thus, by simply moving up the hierarchy, the user is able to establish his relative rank in a larger sub-region.

The user (i.e. PSGUY1), realizing that he is highly-ranked amongst his city, may then be interested in seeing how he compares to an even larger sample size. FIG. 3C depicts a leaderboard illustrating the rank of a user (i.e., PSGUY1) within a region of the partitioned world that encompasses both the smallest sub-region in FIG. 3A and larger sub-region in FIG. 3B.). The user in this example (i.e., PSGUY1) is no longer ranked in the top-10 of the leaderboard. Instead, he is the $100^{th}$ highest-ranking member of the leaderboard, due to the larger sub-region comprising a greater number of high-scoring users than the smallest sub-region. Also, the users ranked number 11 and 12 in the leaderboard of FIG. 3B are no longer ranked in the top 10 of the new leaderboard. The ability to transition between regions and sub-regions provides a user of a computer game system with valuable information. By way of example, and not by way of limitation, such valuable information may include attributing the drop in ranking for PSGUY 1 when transitioning from the larger sub-region in FIG. 3B to the region in FIG. 3C to the notion that other sub-regions within Northern California have significantly more skilled users.

Figure 4:
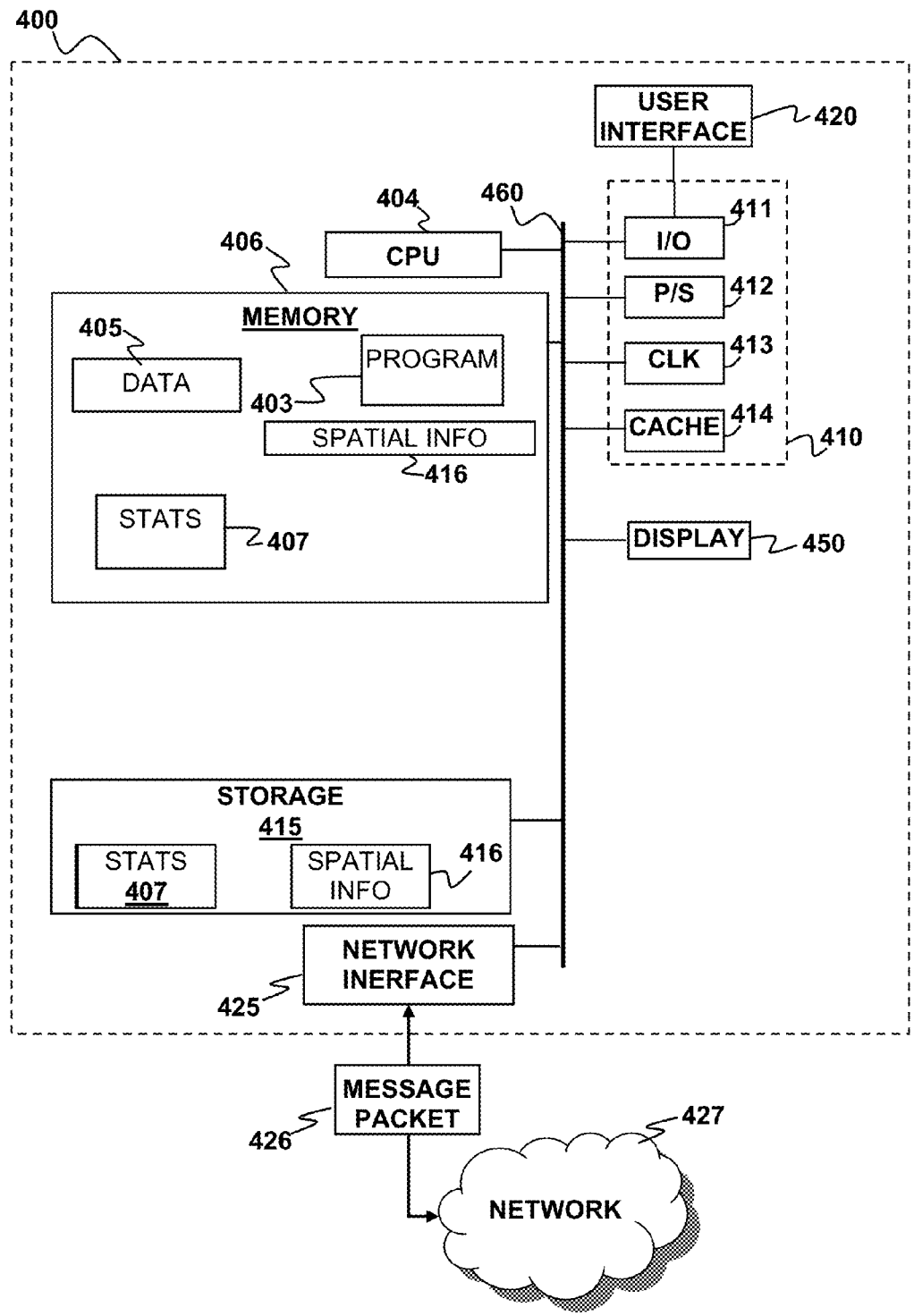
FIG. 4 illustrates a block diagram of a computer server apparatus that may be used to implement a method for establishing a location-based leaderboard by a computer game system according to an embodiment of the present invention.

There are a number of different implementations in which the computer system 103 depicted in FIG. 1A may implement a location-based leader board, e.g., as described above with respect to FIG. 1A. In some, but not all, of these embodiments, the method may be implemented through the server 106. By way of example, and without loss of generality, the server 106 in the system 103 may be configured as shown in FIG. 4. As illustrated in FIG. 4, a server 400 may include a central processing unit (CPU) 404 configured to run software applications and optionally an operating system. The CPU 404 may include one or more processing cores. By way of example and without limitation, the CPU 404 may be a parallel processor module, such as a Cell Processor or other multi-core processor module.

A memory 406 is coupled to the CPU 404. The memory 406 may store applications and data for use by the CPU 404. The memory 406 may be in the form of an integrated circuit, e.g., RAM, DRAM, ROM, and the like). A computer program 403 may be stored in the memory 406 in the form of instructions that can be executed on the processor 404. A current update value 401 may be stored in the memory 406. The instructions of the program 403 may be configured to implement, amongst other things, establishment of a location-based leaderboard, e.g., as described above with respect to FIG. 1B. Specifically, the server 400 may be configured, e.g., through appropriate programming of the program 403, to associate a location of a user of a computer system to a smallest sub-region of a real or virtual world. The world can be partitioned into a set of regions and sub-regions using a hierarchical spatial data structure. The regions and sub-regions can be arranged according to a hierarchy. In the hierarchy, each sub-region may be encompassed by a higher-level sub-region or region and two or more highest-level sub-regions may be encompassed by a region defined by the hierarchical spatial data structure. The server may obtain a rank of the user within a region or sub-region encompassing the smallest sub-region to which the user's location was assigned. The rank can be determined using the one or more statistics associated with the user.

In some embodiments, the program 403 may be a component (e.g., a subroutine or function) of a larger program that implements a larger functionality. Such larger functionality may include simulation of a world in the context of a virtual world or video game program.

In the context of embodiments related to video games, the memory 406 may also contain game-related data 405 from which the program 403 may generate the statistics 407, which can be stored in memory. The data 405 may include information relating to the interactions of multiple users with a game program, which may be implemented on the server or 400 on a different server to which the server 400 is connected via a network.

The server 400 may also include well-known support functions 410, such as input/output (I/O) elements 411, power supplies (P/S) 412, a clock (CLK) 413 and cache 414. The mediation server 400 may further include a storage device 415 that provides non-volatile storage for applications and data. The storage device 415 may be used for temporary or long-term storage of information 416. By way of example, the information 416 may associate users of a computer system with corresponding locations according to a hierarchical spatial data structure. The computer system may involve multiple users and multiple corresponding client devices. The data structure may be arranged according to a hierarchy wherein the world is partitioned into a set of regions and sub-regions using hierarchical spatial data structure, as described above. The regions and sub-regions can be arranged according to a hierarchy. Each sub-region can be encompassed by a higher-level sub-region or region and two or more highest-level sub-regions can be encompassed by a region created by the hierarchical spatial data structure. Alternatively, the user statistics 407 (or portions thereof) may be stored in the storage device 415. By way of example, the storage device 415 may be a fixed disk drive, removable disk drive, flash memory device, tape drive, CD-ROM, DVD-ROM, Blu-ray, HD-DVD, UMD, or other optical storage devices.

One or more user input devices 420 may be used to communicate user inputs from one or more users to the server 400. By way of example, one or more of the user input devices 420 may be coupled to the server 400 via the I/O elements 411. Examples of suitable input device 420 include keyboards, mice, joysticks, touch pads, touch screens, light pens, still or video cameras, and/or microphones. The server 400 may include a network interface 425 to facilitate communication via an electronic communications network 427. The network interface 425 may be configured to implement wired or wireless communication over local area networks and wide area networks such as the Internet. The server 400 may send and receive data and/or requests for files via one or more message packets 426 over the network 427.

The components of the server 400, including the CPU 405, memory 406, support functions 410, data storage 415, user input devices 420, and network interface 425, may be operably connected to each other via one or more data buses 460. These components may be implemented in hardware, software or firmware or some combination of two or more of these.

Figure 5:
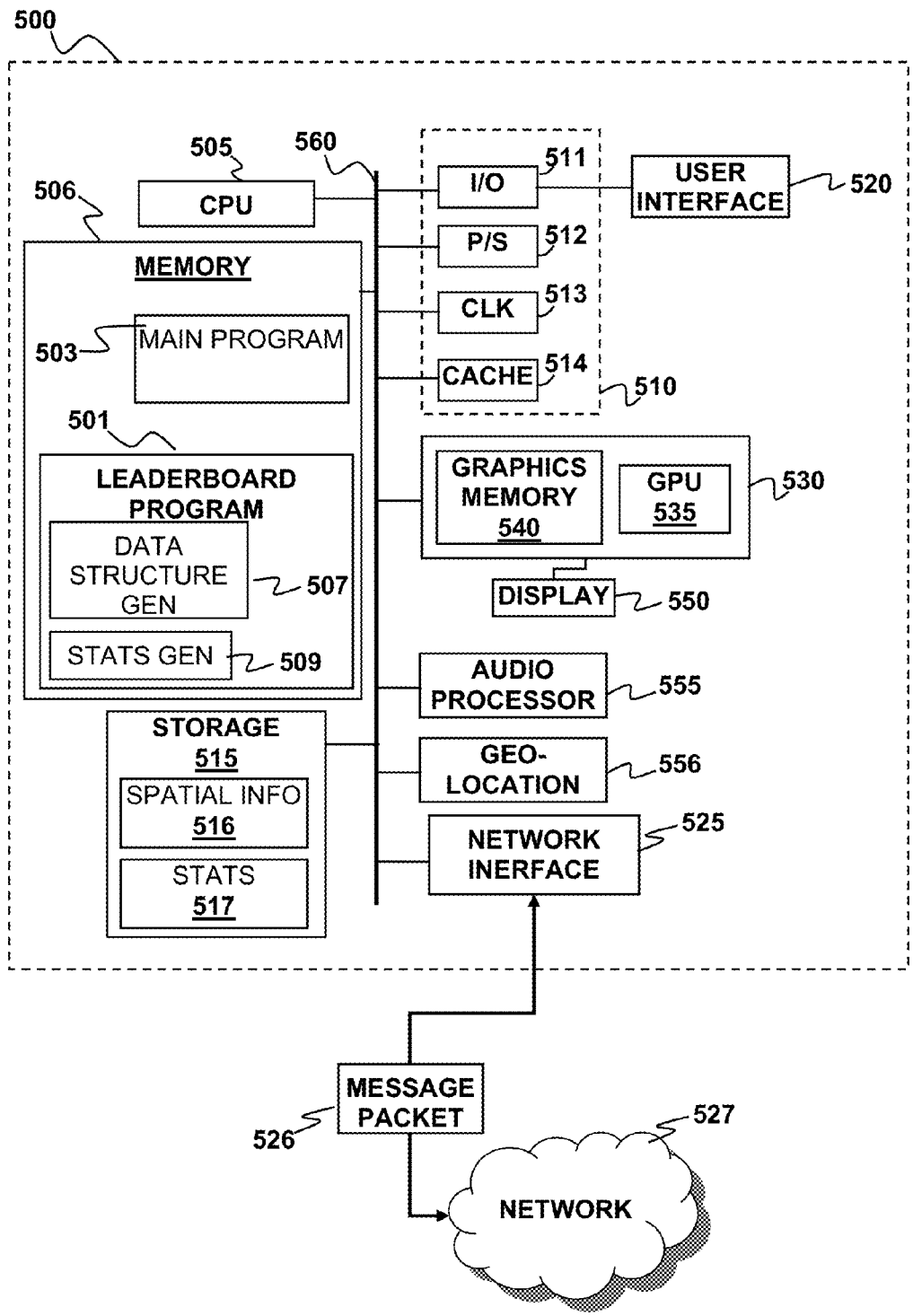
FIG. 5 illustrates a block diagram of a client device that may be used to implement a method for establishing a location-based leaderboard by a computer game system according to an embodiment of the present invention.

As noted above, embodiments of the present invention may be implemented partly on a client device 104. By way of example, the client device 104 may be configured as shown in FIG. 5, which depicts a block diagram illustrating the components of a client device 500 according to an embodiment of the present invention. By way of example, and without loss of generality, the client device 500 may be implemented as a computer system, such as a personal computer, video game console, personal digital assistant, or other digital device, suitable for practicing an embodiment of the invention. The client device 500 may include a central processing unit (CPU) 505 configured to run software applications and optionally an operating system. The CPU 505 may include one or more processing cores. By way of example and without limitation, the CPU 505 may be a parallel processor module, such as a Cell Processor that uses one or more main processors, sometimes called power processor units (PPU) and one or more co-processor elements sometimes called synergistic processor elements (SPE) having dedicated local storage units. Alternatively, the CPU may be any single-core or multi-core processor.

A memory 506 is coupled to the CPU 505. The memory 506 may store applications and data for use by the CPU 505. The memory 506 may be in the form of an integrated circuit, e.g., RAM, DRAM, ROM, and the like). A computer program 501 may be stored in the memory 506 in the form of instructions that can be executed on the processor 505. The instructions of the program 501 may be configured to implement, amongst other things, establishment of a location-based leaderboard, e.g., as described above with respect to FIG. 1B. Specifically, the server 500 may be configured, e.g., through appropriate programming of the program 503, to associate a location of a user of a computer system to a smallest sub-region of a real or virtual world. The world can be partitioned into a set of regions and sub-regions using a hierarchical spatial data structure. The regions and sub-regions can be arranged according to a hierarchy. In the hierarchy, each sub-region may be encompassed by a higher-level sub-region or region and two or more highest-level sub-regions may be encompassed by a region defined by the hierarchical spatial data structure. The server may obtain a rank of the user within a region or sub-region encompassing the smallest sub-region to which the user's location was assigned. The rank can be determined using the one or more statistics associated with the user.

The location-based leader board program 501 may operate in conjunction with one or more instructions configured to implement an interactive environment. By way of example, such instructions may be a subroutine or callable function of a main program 503, such as a video game or virtual world simulation program. Alternatively, the main program 503 may be a program for interfacing with a virtual world. The leaderboard program 501 may include instructions for hierarchical spatial data structure generation 507 and statistics generation 509. The main program 503 may call the leaderboard program 501 as a function or subroutine. Similarly, the leaderboard program 503 may call the data structure generation program 507, or statistics generation program 509, e.g., as a functions or subroutines.

The client device 500 may also include well-known support functions 510, such as input/output (I/O) elements 511, power supplies (P/S) 512, a clock (CLK) 513 and cache 514. The client device 500 may further include a storage device 515 that provides non-volatile storage for applications and data. The storage device 515 may be used for temporary or long-term storage of hierarchical spatial data structure information 516, which can be generated by the data structure generation program 507 or downloaded from a remote server. In addition the storage device 515 may store statistics 517, which can be generated by the statistics generation program 509 or downloaded from a remote server. By way of example, the storage device 515 may be a fixed disk drive, removable disk drive, flash memory device, tape drive, CD-ROM, DVD-ROM, Blu-ray, HD-DVD, UMD, or other optical storage devices. Stored data structure information 516 or statistics 517 may be stored in the storage device 515 for quick loading into the memory 506.

One or more user input devices 520 may be used to communicate user inputs from one or more users to the computer client device 500. By way of example, one or more of the user input devices 520 may be coupled to the client device 500 via the I/O elements 511. Examples of suitable input device 520 include keyboards, mice, joysticks, touch pads, touch screens, light pens, still or video cameras, and/or microphones. The client device 500 may include a network interface 525 to facilitate communication via an electronic communications network 527. The network interface 525 may be configured to implement wired or wireless communication over local area networks and wide area networks such as the Internet. The client device 500 may send and receive data and/or requests for files via one or more message packets 526 over the network 527.

The client device 500 may further comprise a graphics subsystem 330, which may include a graphics processing unit (GPU) 535 and graphics memory 540. The graphics memory 540 may include a display memory (e.g., a frame buffer) used for storing pixel data for each pixel of an output image. The graphics memory 540 may be integrated in the same device as the GPU 535, connected as a separate device with GPU 335, and/or implemented within the memory 506. Pixel data may be provided to the graphics memory 540 directly from the CPU 505. Alternatively, the CPU 505 may provide the GPU 535 with data and/or instructions defining the desired output images, from which the GPU 535 may generate the pixel data of one or more output images. The data and/or instructions defining the desired output images may be stored in memory 510 and/or graphics memory 540. In an embodiment, the GPU 535 may be configured (e.g., by suitable programming or hardware configuration) with 3D rendering capabilities for generating pixel data for output images from instructions and data defining the geometry, lighting, shading, texturing, motion, and/or camera parameters for a scene. The GPU 535 may further include one or more programmable execution units capable of executing shader programs.

The graphics subsystem 530 may periodically output pixel data for an image from the graphics memory 540 to be displayed on a video display device 550. By way of example, and not by way of limitation, such images may include images similar to those depicted in FIG. 3A, FIG. 3B, or FIG. 3C. The video display device 550 may be any device capable of displaying visual information in response to a signal from the client device 500, including CRT, LCD, plasma, and OLED displays. The computer client device 500 may provide the display device 550 with an analog or digital signal. By way of example, the display 550 may include a cathode ray tube (CRT) or flat panel screen that displays text, numerals, graphical symbols or images. In addition, the display 550 may include one or more audio speakers that produce audible or otherwise detectable sounds. To facilitate generation of such sounds, the client device 500 may further include an audio processor 555 adapted to generate analog or digital audio output from instructions and/or data provided by the CPU 505, memory 506, and/or storage 515.

The components of the client device 500, including the CPU 505, memory 506, support functions 510, data storage 515, user input devices 520, network interface 525, audio processor 555, and an optional geo-location device 556 may be operably connected to each other via one or more data buses 560. These components may be implemented in hardware, software or firmware or some combination of two or more of these.

It is noted that in some embodiments it may be desirable to determine a location for the client device 500 in order to facilitate the operation of the location-based leaderboard program 503. Knowledge of the location of the client device 500 can facilitate determining a relevant region, sub-region, or sub-sub region for a user of the device. By way of example, and not by way of limitation, the leaderboard program 503 may use information obtained by the geo-location device 556 to facilitate determination of the location of the client device 500. The leaderboard program 503 can combined this information, along with information regarding the locations of other similarly configured client devices and statistics regarding those devices to generate location-based leaderboards.

By way of example, and not by way of limitation, the geo-location device 556 may include a global positioning satellite (GPS) receiver. The GPS receiver can send and receive signals from a plurality of global positioning satellites and determine the distance from the satellites through measurement of the round trip time for the signals. The leaderboard program 503 or main program 501 may implement a suitable triangulation or circulation algorithm to determine the location of the device using distances to different satellites. It is noted that embodiments of the invention are not limited to those that utilize GPS to determine location. For example, geo-location may be based on a cellular telephone network that uses a plurality of cell towers. The geo-location device may be a cellular network interface that receives a signal that includes, among other things, information identifying a cell tower with which the device 500 is in direct communication. The location of the device may be approximately determined from the location of the cell tower.

Figure 6:
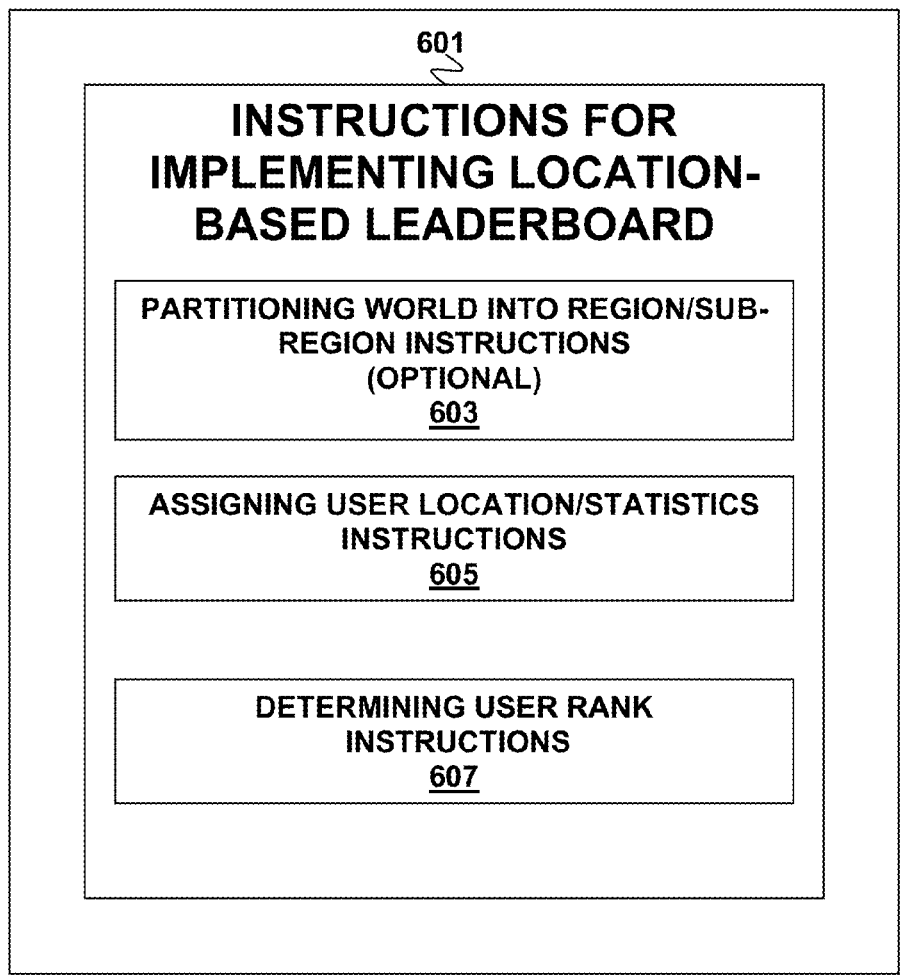
FIG. 6 illustrates an example of a non-transitory computer readable storage medium in accordance with an embodiment of the present invention

According to another embodiment, instructions for implementing a method for establishing a location-based leaderboard using a computer game system may be stored in a computer readable storage medium. By way of example, and not by way of limitation, FIG. 6 illustrates an example of a non-transitory computer readable storage medium 600 in accordance with an embodiment of the present invention. The storage medium 600 contains computer-readable instructions stored in a format that can be retrieved, interpreted, and executed by a computer processing device. By way of example, and not by way of limitation, the computer-readable storage medium 600 may be a computer-readable memory, such as random access memory (RAM) or read only memory (ROM), a computer readable storage disk for a fixed disk drive (e.g., a hard disk drive), or a removable disk drive. In addition, the computer-readable storage medium 600 may be a flash memory device, a computer-readable tape, a CD-ROM, a DVD-ROM, a Blu-Ray, HD-DVD, UMD, or other optical storage medium.

The storage medium 600 contains instructions for establishing a location-based leaderboard 601 configured to implement a method for establishing a location-based leaderboard by a computer game system in accordance with the method described above with respect to FIG. 1B. In particular, the instructions for establishing a location-based leaderboard 601 may optionally include partitioning globe into region/sub-region instructions 603 that are used to partition the globe into a set of regions and sub-regions using a hierarchical spatial data structure, wherein the regions and sub-regions are arranged according to a hierarchy, each sub-region being encompassed by a higher-level sub-region or region, and two or more highest-level sub-regions being encompassed by a region. The size of each sub-region may vary depending on the user's physical location and the population density of the area surrounding that location, as discussed above.

The instructions for establishing a location-based leaderboard 601 may also include assigning user location/statistic instructions 605 that are used to assign a location of a user of the computer game system along with one or more statistics associated with the user to a smallest sub-region created by the hierarchical spatial data structure.

The instructions for establishing a location-based leaderboard 601 may additionally include determining user rank instructions 607 that are used to determine a rank of the user within a region or sub-region encompassing the smallest sub-region to which the user's location was assigned, wherein the rank is determined using the one or more statistics associated with the user.

Embodiments of the present invention allow a computer system to generate more useful and interesting leaderboards, thereby enhancing the value of the computer system to its users.

While the above is a complete description of the preferred embodiment of the present invention, it is possible to use various alternatives, modifications, and equivalents. Therefore, the scope of the present invention should be determined not with reference to the above description, but should, instead be determined with reference to the appended claims, along with their full scope of equivalents. Any feature described here, whether preferred or not, may be combined with any other feature described herein, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly received in a given claim using the phrase "means for".

What is claimed is:

1. A computer-implemented method for establishing a location-based leaderboard by a computer system, comprising:
   a) associating a location of a user of the computer system in a virtual world to a smallest sub-region of the virtual world with the computer system, wherein the virtual world is partitioned into a set of regions and sub-regions using a hierarchical spatial data structure, wherein the regions and sub-regions are arranged according to a hierarchy, each sub-region being encompassed by a higher-level sub-region or region, and two or more highest-level sub-regions being encompassed by a region created by the hierarchical spatial data structure;
   b) obtaining a rank of the user within a region or sub-region encompassing the smallest sub-region to which the user's location was assigned, wherein the rank is determined using one or more statistics associated with the user, wherein the size of the sub-regions or regions created by the hierarchical spatial data structure are established based on population density for the region or sub-region, and wherein a region or sub-region is subdivided if the population density of the region or sub-region is above a threshold.

2. The method of claim 1, further comprising partitioning the world into the set of regions and sub-regions with the computer system using the hierarchical spatial data structure.

3. The method of claim 1, further comprising displaying, storing, or transmitting the rank obtained in b) with the computer system.

4. The method of claim 1, wherein the location of the user is determined by a global positioning system (GPS) in the computer system.

5. The method of claim 1, wherein the computer system is a computer game system.

6. The method of claim 5, wherein the one or more statistics associated with the user include a number of computer game trophies earned.

7. The method of claim 5, wherein the one or more statistics associated with the user include a number of levels completed by the user for a particular game title.

8. The method of claim 5, wherein the one or more statistics associated with the user include a high score earned by the user for a particular game title.

9. The method of claim 1, wherein the hierarchical spatial data structure is a geodesic grid, a quad tree, or an R-tree.

10. A system for implementing a location-based leaderboard, comprising:
    a processor;
    a memory; and
    computer coded instructions embodied in the memory and executable by the processor, wherein the computer coded instructions are configured to execute a method for implementing a location-based leaderboard, comprising:
    a) associating a location of a user of the computer system in a virtual world to a smallest sub-region of the virtual world with the computer system, wherein the virtual world is partitioned into a set of regions and sub-regions using a hierarchical spatial data structure, wherein the regions and sub-regions are arranged according to a hierarchy, each sub-region being encompassed by a higher-level sub-region or region, and two or more highest-level sub-regions being encompassed by a region created by the hierarchical spatial data structure;
    b) obtaining a rank of the user within a region or sub-region encompassing the smallest sub-region to which the user's location was assigned, wherein the rank is determined using one or more statistics associated with the user, wherein the size of the sub-regions or regions created by the hierarchical spatial data structure are established based on population density for the region or sub-region, and wherein a region or sub-region is subdivided if the population density of the region or sub-region is above a threshold.

11. The system of claim 10, wherein the computer-coded instruction further comprise instructions for partitioning the world into the set of regions and sub-regions with the computer system using the hierarchical spatial data structure.

12. The system of claim 10, wherein the computer-coded instruction further comprise instructions for displaying, storing, or transmitting the rank obtained in b).

13. The system of claim 10, further comprising a geo-location device coupled to the processor.

14. The system of claim 10, wherein the system is a computer game system.

15. The system of claim 14, wherein the one or more statistics associated with the user include a number of computer game trophies earned.

16. The system of claim 14, wherein the one or more statistics associated with the user include a number of levels completed by the user for a particular game title.

17. The system of claim 14, wherein the one or more statistics associated with the user include a high score earned by the user for a particular game title.

18. The system of claim 10, wherein the hierarchical spatial data structure is a geodesic grid, a quad tree, or an R-tree.

19. A computer program product comprising:
 a non-transitory, computer-readable storage medium having computer readable program code embodied in said medium for implementing a location-based leaderboard, said computer program product having:
 a) associating a location of a user of the computer system in a virtual world to a smallest sub-region of the virtual world with the computer system, wherein the virtual world is partitioned into a set of regions and sub-regions using a hierarchical spatial data structure, wherein the regions and sub-regions are arranged according to a hierarchy, each sub-region being encompassed by a higher-level sub-region or region, and two or more highest-level sub-regions being encompassed by a region created by the hierarchical spatial data structure;
 b) obtaining a rank of the user within a region or sub-region encompassing the smallest sub-region to which the user's location was assigned, wherein the rank is determined using one or more statistics associated with the user, wherein the size of the sub-regions or regions created by the hierarchical spatial data structure are established based on population density for the region or sub-region, and wherein a region or sub-region is subdivided if the population density of the region or sub-region is above a threshold.

20. The method of claim 1, wherein the hierarchical spatial data structure is a geodesic grid.

21. The system of claim 10, wherein the hierarchical spatial data structure is a geodesic grid.

* * * * *